No. 835,163. PATENTED NOV. 6, 1906.
A. PRIESTMAN.
FILTERING APPARATUS.
APPLICATION FILED DEC. 9, 1904.
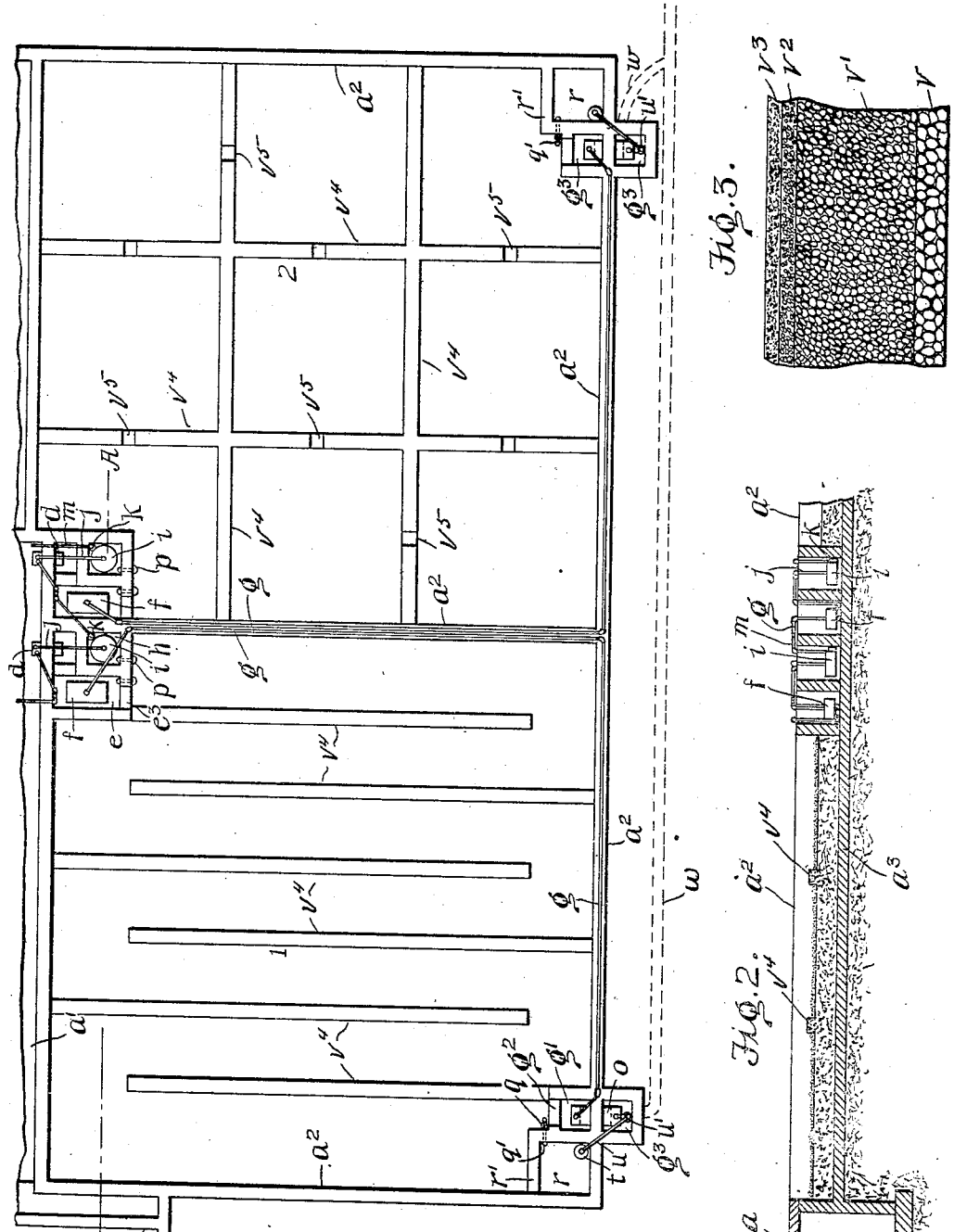

UNITED STATES PATENT OFFICE.

ALBERT PRIESTMAN, OF PHILADELPHIA, PENNSYLVANIA.

FILTERING APPARATUS.

No. 835,163.  Specification of Letters Patent.  Patented Nov. 6, 1906.

Application filed December 9, 1904. Serial No. 236,142.

*To all whom it may concern:*

Be it known that I, ALBERT PRIESTMAN, of the city and county of Philadelphia and State of Pennsylvania, have invented an Improvement in Filtering Apparatus, of which the following is a specification.

The successful filtration and purification of sewage requires not only that the matters held in suspension in the liquid shall be removed, but also that the matters held in solution shall be eliminated or converted. Matter in suspension can readily be effectively removed by the straining or filtering action of sufficiently fine filtering material, such as sand; but the removal of matters held in solution cannot be effectively accomplished in this way, and it is customary to rely upon the work of the micro-organisms in the lower strata of the filtering-bed for breaking up the materials contained in the organic matter and converting them by oxidation into non-objectionable oxidized substances. To effect this result, it is essential that abundant air shall be supplied to the strata beneath the surface, not only for supplying the oxygen necessary to support life in the micro-organisms, but also to supply the oxygen to bring about complete oxidation.

Three principal systems of sewage-filtration are now commonly recognized.

In intermittent downward filtration through sand beds the top layer of sand is relied upon for removing the matters in suspension as well as for extracting bacteria, and the size of the particles of sand, the liquid head of sewage, the depth of the sand, and the arrangement of under drains govern the admission of the air beneath the surface and the resulting oxidation to such an extent that there is great uncertainty as to the results obtainable, because it is seldom possible to prepare and operate these sand-filters so as to prevent the interstices of the sand becoming blocked against the entrance of air by water held by capillary attraction. The flow of the liquid in such filters is always in one direction, and this tends to further close the upper layers of sand to the passage of air by the lodgment of particles of organic and inorganic matter. The liquid also tends to cut channels in the bed, through which it drains away too rapidly and without proper filtration or oxidation.

In the contact-bed system the bed is generally formed of comparatively large pieces of broken stone or coke, in which the sewage is held for a sufficient period of time to enable the bacterial jelly which forms on the pieces to act on the organic matter contained in the liquid. This operation may be repeated in successive beds. By this method a more satisfactory action is obtained, since the carbonic-acid gas formed in the process of oxidation is completely expelled by the rising of the liquid-level and air is drawn into the filtering-bed by the receding of the liquid when it is discharged. This rising and falling of the liquid also prevents the lodgment of particles of organic matter in the interstices of the filtering material. This system is, however, defective, since there is insufficient straining action to remove matters in suspension, and consequently such matters will accumulate in the lower portion of the bed and be carried off into the filtered effluent.

In intermittent, continuous, or streaming filters the liquid is supplied to a filter composed of broken stone or coke of comparatively large size, over which the liquid passes in the form of thin films, drawing in with it a current of air. From such filter the liquid passes to a second filter or to a settling-basin. This process is objectionable, because it is difficult to supply the liquid to the filter with such uniformity as to insure the formation of proper films, and some portions may pass through insufficiently treated. In cold climates the passage of cold air through the filter seriously retards bacterial action. In such filters, also, it is necessary to use a bed of greater depth than is required in intermittent downward sand-filters and contact-beds, and this increase in depth increases the liability of the interstices becoming clogged up by particles or organic matter.

The advantages of these three systems may be obtained in a single filter-bed formed of lower coarse layers and an upper layer of sand when the passage of the sewage through the bed is properly controlled. To render such a filter effective, however, it is necessary that the free introduction of air into the lower strata should be insured and also that the sewage should be properly distributed or caused to flow over the surface of the filter-bed; and the present invention relates to certain improvements in the construction of the filter-bed for accomplishing these results.

In the drawings, Figure 1 is a plan view of a filtering system embodying the invention and illustrating two of a series of filtering-tanks. Fig. 2 is a longitudinal vertical section on the line A A of Fig. 1, and Fig. 3 is a vertical section of the filtering-bed.

Each filtering-tank is formed with an impermeable base $a^3$, of concrete or other suitable material, and a retaining-wall $a^2$. The liquid is admitted to the tank by a suitably-controlled inlet from the septic tank $a$ through a suitable conduit $a'$, and is discharged through a suitably-controlled outlet into the discharge-main $w$.

The filtering-bed, which extends over the base $a^3$ within the retaining-walls $a^2$, is composed of layers of filtering material of different degrees of density, increasing in density from the base upward.

A filtering-bed, which I have found especially adapted to my purposes is composed as follows, (see Fig. 3:) A lower stratum $v$—say six inches thick—of broken stone or coke of larger size; above this a second stratum $v'$ of greater thickness—say two feet—of similar material of smaller size; above this, again, a third stratum $v^2$—say three inches thick—of gravel, and on the surface a three-inch stratum $v^3$, of sand.

The liquid is admitted to the tank above the surface of the filtering-bed and will first percolate through the bed to the base. It will then rise in level through the bed until it reaches a height usually substantially above the surface of bed. It may be, and preferably is, allowed to remain in this condition for a given period of time, when the outlet is opened and the liquid is permitted to flow out. The liquid flows out from the lower strata of the filtering-bed, and its level will then fall and the liquid will again percolate the bed in a downward direction. Thus the liquid first passes down through the bed, and after its level has risen in the bed it again sinks through it. The level of the liquid may thus be caused to rise and fall through the filtering-bed.

The liquid in first passing through the top layer of sand is effectively strained, and its passage is so slow that practically all matters in suspension are extracted. Owing to the slow passage through the sand the liquid will pass through the gravel in the form of thin films and thence over the surfaces of the broken stones, where oxidation will be effected in a manner similar to the system of streaming filtration. As the liquid accumulates in the bottom the level will rise through the successive strata to such height as may be determined by the regulation of the supply and outlet. This rising of the level of the liquid through the filtering-bed will dislodge any matter that may have found lodgment in the interstices of the gravel or broken stone and will prevent the bed becoming clogged. If the level of the liquid is permitted to rise above the surface of the sand, which is not, however, necessary to my invention, it will likewise act to dislodge particles in the sand-bed and open it up to the passage of the air for oxidation, as well as to draw air into the lower strata when its level again sinks below the sand.

The liquid lying at the bottom upon the broken stone will be acted upon in the manner of the contact-bed system. When the liquid flows out, the lower strata $v'$ $v^2$ $v^3$ will be exposed to the air drawn in through the thin top layer of sand. To effect these results, it is necessary that the flow of the liquid into and out of the filtering-bed should be properly controlled. For this purpose I have shown a system of automatic control which is more particularly described in my Letters Patent No. 749,825, dated January 19, 1904. In this system the inlet is through an inverted-U-shaped pipe $d$ into a chamber $e$, from which it flows over a suitable weir into the tank 1, upon the surface of the filtering-bed. $o$ is the outlet-pipe, which is also an inverted-U-shaped pipe having one leg in the outlet-chamber $q'$ communicating with the tank, and the other leg in the discharge-chamber $q^3$ communicating with the drain $w$.

In the inlet-chamber $e$ is an air-bell $f$, from which an air-pipe $g$ leads to the outlet-pipe $o$. When the liquid rises to a certain level in the chamber $e$ and begins to flow into the tank 1, air is forced through the pipe $g$ to air-bind the pipe $o$ and close the outlet.

$h$ is an inlet-controlling chamber communicating with the tank 1 by a feed-pipe $p$, preferably having a water seal on the tank side. $i$ is a bell in the tank 1, from which an air-pipe $j$ leads to the inlet-pipe $d$. When the liquid rises in the chamber $r$ to a given level—i. e., when the tank 1 is filled to the desired height—air is forced from the bell $i$ through pipe $j$ into the inlet-pipe $d$ to air-bind it and close the inlet. In the chamber $h$ is a small bell $k$, from which air-pipe $m$ leads to a siphon-pipe from the inlet-pipe $d$ to the next tank 2. When the liquid rises in the chamber $h$ and closes the inlet-pipe to tank 1, as has been described, air is forced from the bell $k$, through the pipe $m$ to unseal the inlet-pipe $d$ to tank 2 and open the inlet.

$r$ is an outlet-controlling chamber communicating with the tank 1 by a feed-pipe $q$. In the chamber $r$ is an air-bell $t$, from which an air-pipe $u$ leads to a siphon-pipe from the outlet-pipe $o$. When the liquid-level rises in the chamber $r$, air is forced from bell 1 through pipe $u$ and breaks the seal in the outlet-pipe $o$, opening it to the discharge of the liquid.

This automatic controlling apparatus operates as follows: The liquid flows through the inlet-pipe $d$ into the chamber $e$, and when it reaches a sufficient level therein to flow over the weir $e^3$ into the tank 1 air is compressed in the bell $f$ and forced through the pipe $g$ into the outlet-pipe $o$ to air-bind it and seal the outlet. The liquid continues to flow into the tank 1, passing down through the strata of the filtering-bed in the manner described. A portion of the liquid flows through the pipe $p$ into the chamber $h$, and when the tank 1 has filled to the desired height the liquid in the chamber $h$ will compress air in the bell $i$ and force it through the pipe $j$ into the inlet-pipe $d$ to air-bind it and close the inlet. At the same time the air compressed in the bell $k$ in chamber $h$ is forced through the pipe $m$ and breaks the air-seal in the inlet-pipe $d$ to tank No. 2, which had previously been sealed in the manner above described with reference to the inlet-pipe $d$ of tank No. 1. Meanwhile liquid has been flowing through the pipe $q$ into the chamber $r$, and when it assumes a given level therein air is forced from the bell $t$ through the pipe $u$ into the siphon-pipe from the outlet-pipe $o$, breaking the seal and opening said pipe. The flow into the chamber $r$ may be controlled by suitable means, as by a valve in the pipe $q$, to regulate the length of time the liquid will remain in contact with the filtering and purifying material before the outlet is opened.

With this system of automatic controlling devices the passage of the liquid through the strata of the filtering-bed in the manner described may be insured, and by arranging the bells at the proper elevation the liquid may be caused to assume any level desired in the tank, either above or below the surface of the upper layer of sand.

To insure the passage of air into the lower coarser strata of filtering material, which is necessary to support the life of the microorganisms and to produce complete oxidation, the coarser strata may at intervals extend up above the top stratum $v^3$ of sand, as shown at $v^4$, so that not only is a free passage-way for the air afforded, but in case the top layer of sand becomes clogged and more or less air-tight the air may still pass through these extensions of coarser material into the lower strata. To insure these projections being kept free and open, they are preferably extended above the maximum normal level of the liquid. These projections or extensions $v^4$ of the lower coarser material are arranged in the form of walls, preferably as shown in Fig. 1, and when their sides are banked with sand or other fine material they will act as barriers and when properly arranged will form a liquid course or passage to guide the liquid in a continuous flow through the bed from the inlet to the outlet. They may be arranged in different ways to accomplish this result. Thus in tank No. 1 they extend from one side wall nearly to the opposite wall and form a serpentine passage-way from the inlet to the outlet. In tank No. 2 they cross one another, dividing the tank into a series of squares, and are provided with liquid openings $v^5$, forming communication between successive squares in series to cause the liquid to flow through the squares in succession.

While the upper surface of the bed should be kept free and open by frequent rakings, the negligence of the attendants sometimes allows it to become clogged and closed, and as the liquid when it first enters the filtering-bed is most dense and heavily charged this clogging is most liable to occur at those parts of the bed which are nearest the inlet. By this arrangement of barriers the liquid must traverse the entire bed before it can reach the outlet, and those portions which are nearest the outlet are kept much freer and open, so that an effective filtration at those places is insured even when the portions of the bed near the inlet have become ineffective.

In some cases the upper layer of sand or fine material may be omitted at those portions near the outlet.

What I claim as new, and desire to secure by Letters Patent, is as follows:

A filtering-bed composed of an upper layer of fine material, such as sand, and lower layers of coarser material, said coarser material projecting above the layer of fine material in the form of walls constituting barriers to guide the liquid throughout the bed.

In testimony of which invention I hereunto set my hand.

ALBERT PRIESTMAN.

Witnesses:
ERNEST HOWARD HUNTER,
R. M. KELLY.